(12) United States Patent
Misaka

(10) Patent No.: US 7,672,019 B2
(45) Date of Patent: Mar. 2, 2010

(54) ENHANCING RESOLUTION OF A COLOR SIGNAL USING A MONOCHROME SIGNAL

(75) Inventor: Naoyuki Misaka, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1210 days.

(21) Appl. No.: 11/220,571

(22) Filed: Sep. 8, 2005

(65) Prior Publication Data

US 2007/0053022 A1 Mar. 8, 2007

(51) Int. Cl.
*H04N 1/409* (2006.01)
*G06K 9/40* (2006.01)

(52) U.S. Cl. .................... 358/3.27; 382/254

(58) Field of Classification Search ............... 358/3.27, 358/461, 474, 500, 516, 518, 520, 521
See application file for complete search history.

(56) References Cited

U.S. PATENT DOCUMENTS 5,045,932 A * 9/1991 Sharman et al. ............ 358/527

FOREIGN PATENT DOCUMENTS

JP 2003-087556 A 3/2003

OTHER PUBLICATIONS

U.S. Appl. No. 10/790,009, Misaka et al., filed Mar. 2, 2004.

* cited by examiner

*Primary Examiner*—Benny Q Tieu
*Assistant Examiner*—Eric A Rust
(74) *Attorney, Agent, or Firm*—Foley & Lardner LLP

(57) ABSTRACT

An image scanning apparatus includes three color line sensors for outputting red, green, and blue color signals, a monochrome line sensor for outputting a monochrome signal having a higher resolution than the color signals, and a resolution-enhancement processor. The resolution-enhancement processor enhances a resolution of a pixel signal of the color signals, based on a monochrome smoothed value obtained by smoothing a signal of an arbitrary pixel of the monochrome signal and signals of pixels around the arbitrary pixel and a color smoothed value obtained by smoothing a signal of a pixel of each color signal and signals of pixels around the pixel of the color signal, the pixel of the color signal corresponding to the position of the arbitrary pixel of the monochrome signal. The image scanning apparatus can perform high-luminance and high-resolution scanning with a 4-line configuration and can reduce color-misalignment phenomenon due to motor drive.

20 Claims, 13 Drawing Sheets

ENHANCING RESOLUTION OF A COLOR SIGNAL USING A MONOCHROME SIGNAL

BACKGROUND OF THE INVENTION

1. Field of the Invention

The present invention relates to image scanning apparatuses, image processing apparatuses, image producing apparatuses, and image processing methods. In particular, the present invention relates to an image scanning apparatus, an image processing apparatus, an image producing apparatus, and an image processing method for generating high-resolution color images.

2. Description of the Related Art

Conventionally, in image scanning apparatuses, such as scanners, and image producing apparatuses, such as copiers, a 3-line CCD sensor constituted by three line sensors for red, green, and blue has typically been used as a color-image scanning sensor.

The 3-line CCD sensor has a configuration in which three 1-dimensional line sensors, which have red, green, and blue color filters on the respective light receiving surfaces, are arranged. Thus, the 3-line CCD sensor cannot simultaneously scan the same spot on a document with all the line sensors. Accordingly, with respect to position misalignment in a document scanning direction, a memory circuit including line memories or the like is used to align image signal positions scanned by the line sensors.

In recent years, a 4-line CCD sensor constituted by 4 line sensors has also been commercially available. The 4-line CCD sensor includes a monochrome scanning line sensor that does not have a color filter on the light receiving surface, in addition to the 3-line CCD sensor for scanning color images.

Patent Document 1 (JP-A 2003-87556) discloses an image scanning apparatus using a 4-line CCD sensor, i.e., a monochrome scanning line sensor and a three color scanning line sensors. In the disclosed technology, the pixel light-receiving area of the monochrome-scanning line sensor and the pixel light-receiving area of each color-scanning line sensor are different from each other, so that a monochrome document is scanned with a high resolution and a color document is scanned with a high sensitivity. Patent Document 1 further discloses a technology for enhancing the resolution of an image, obtained by the color-scanning line sensors, by using a high-resolution luminance signal obtained by the monochrome-scanning line sensor.

A typical image-scanning apparatus scans an image by causing a motor to mechanically drive line sensors. Thus, motor speed-irregularity, vibration, and so on often affect the image. In particular, with color line CCD sensors, since the line CCD sensors for red, green, and blue are physically spaced apart from each other, the occurrence of motor speed-irregularity and/or vibration can cause color misalignment. Even with, for example, the image scanning apparatus using the 4-line CCD sensor disclosed in Patent Document 1, the color misalignment can similarly occur.

SUMMARY OF THE INVENTION

In view of the foregoing situation, an object of the present invention is to provide an image scanning apparatus, an image processing apparatus, an image producing apparatus, and an image processing method which perform high-luminance and high-resolution image scanning with a four-line configuration and which are capable of reducing the color misalignment phenomenon due to the motor drive.

To achieve the object described above, an image scanning apparatus according to the present invention includes three color line sensors for outputting red, green, and blue color signals, respectively; and a monochrome line sensor for outputting a monochrome signal having a higher resolution than the color signals. The image scanning apparatus further includes a resolution-enhancement processor for enhancing a resolution of a pixel signal of the color signals, based on a monochrome smoothed value obtained by smoothing a signal of an arbitrary pixel of the monochrome signal and signals of pixels around the arbitrary pixel and a color smoothed value obtained by smoothing a signal of a pixel of each color signal and signals of pixels around the pixel of the color signal, the pixel of the color signal corresponding to the position of the arbitrary pixel of the monochrome signal.

To achieve the object described above, an image processing apparatus according to the present invention includes an input section for inputting red, green, and blue color signals from three color line sensors and inputting, from a monochrome line sensor, a monochrome signal having a higher resolution than the color signals; and a resolution-enhancement processor for enhancing a resolution of a pixel signal of the color signals, based on a monochrome smoothed value obtained by smoothing a signal of an arbitrary pixel of the monochrome signal and signals of pixels around the arbitrary pixel and a color smoothed value obtained by smoothing a signal of a pixel of each color signal and signals of pixels around the pixel of the color signal, the pixel of the color signal corresponding to the position of the arbitrary pixel of the monochrome signal.

To achieve the object described above, an image producing apparatus according to the present invention includes three color line sensors for outputting red, green, and blue color signals, respectively; and a monochrome line sensor for outputting a monochrome signal having a higher resolution than the color signals. The image producing apparatus further includes a resolution-enhancement processor for enhancing a resolution of a pixel signal of the color signals, based on a monochrome smoothed value obtained by smoothing a signal of an arbitrary pixel of the monochrome signal and signals of pixels around the arbitrary pixel and a color smoothed value obtained by smoothing a signal of a pixel of each color signal and signals of pixels around the pixel of the color signal, the pixel of the color signal corresponding to the position of the arbitrary pixel of the monochrome signal; and an image producing section for producing an image based on the color signals having the enhanced resolution.

To achieve the object described above, an image processing method according to the present invention includes an inputting step of inputting red, green, and blue color signals from three color line sensors and inputting, from a monochrome line sensor, a monochrome signal having a higher resolution than the color signals; and a resolution-enhancement processing step of enhancing a resolution of a pixel signal of the color signals, based on a monochrome smoothed value obtained by smoothing a signal of an arbitrary pixel of the monochrome signal and signals of pixels around the arbitrary pixel and a color smoothed value obtained by smoothing a signal of a pixel of each color signal and signals of pixels around the pixel of the color signal, the pixel of the color signal corresponding to the position of the arbitrary pixel of the monochrome signal.

BRIEF DESCRIPTION OF THE DRAWINGS

FIG. 9 is a third diagram illustrating the content of the resolution-enhancement processing performed by the image scanning apparatus of the embodiment of the present invention;

FIG. 10 is a fourth diagram illustrating the content of the resolution-enhancement processing performed by the image scanning apparatus of the embodiment of the present invention;

DESCRIPTION OF THE PREFERRED EMBODIMENTS

An image scanning apparatus, an image processing apparatus, an image producing apparatus, and an image processing method according to embodiments of the present invention will be described below with referenced to the accompanying drawings.

1) Configuration of Image Scanning Apparatus

Figure 1:
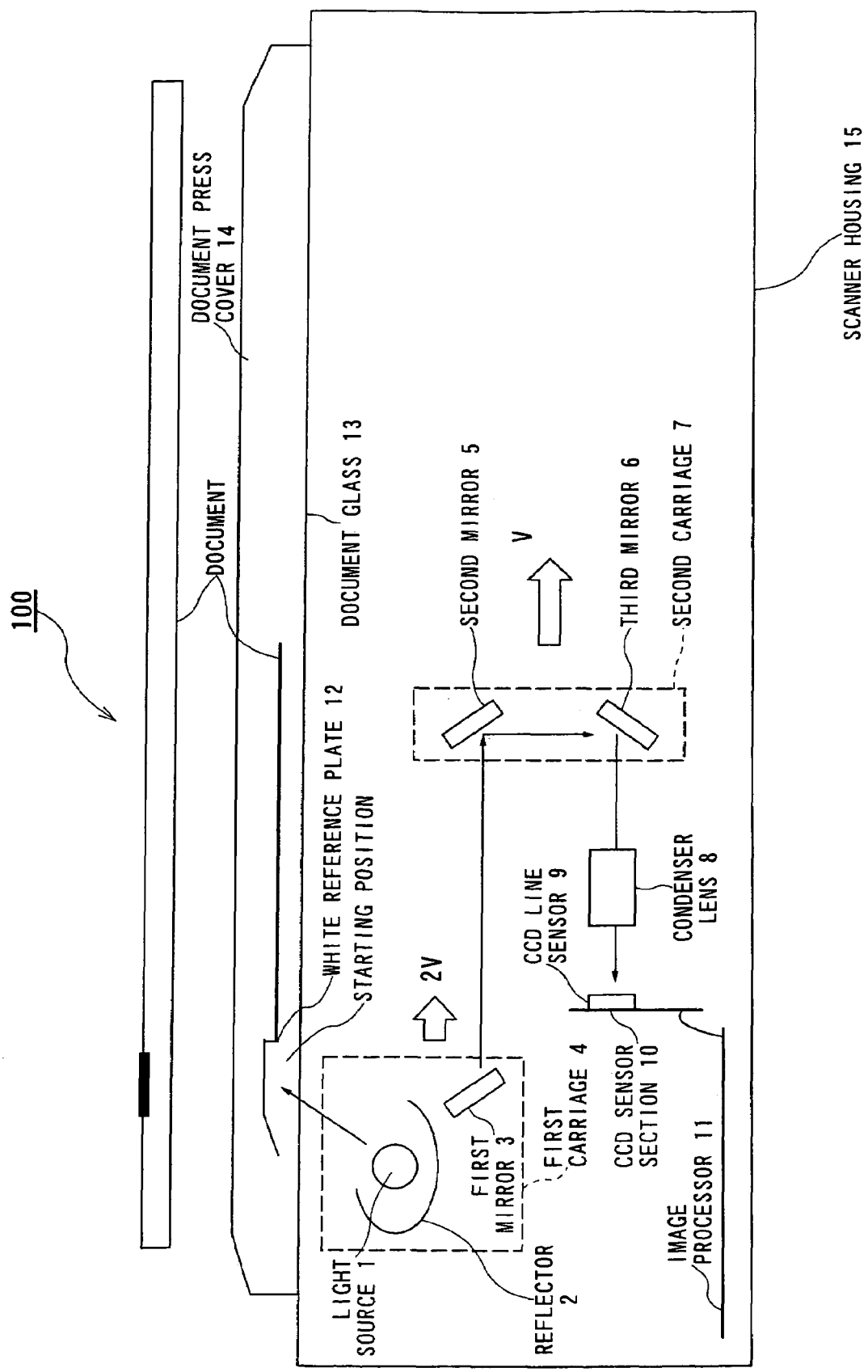
FIG. 1 is a schematic view showing an exemplary configuration of an image scanning apparatus according to one embodiment of the present invention.

FIG. 1 is a schematic view showing an exemplary configuration of an image scanning apparatus (scanner) 100 according to an embodiment of the present embodiment.

The image scanning apparatus 100 includes a first carriage 4, a second carriage 7, a condenser lens 8, a CCD sensor section 10 (a CCD sensor board 10) having a CCD line sensor 9, an image processor 11 (a control board 11) for controlling the CCD line sensor 9 and performing various types of processing, a white reference plate 12 serving as a reference for white color, a document glass 13 for placing a document, a document press cover 14 for fixing the document so that no gap exists between the document and the document glass 13, and a scanner housing 15 in which those components are housed and arranged. The first carriage 4 has a light source 1, a reflector 2 for correcting a light distribution characteristic of the light source 1, and a first mirror 3. The second carriage has a second mirror 5 and a third mirror 6.

Light emitted from the light source 1 passes through the document glass 13 and illuminates a document. The light distribution of the light emitted from the light source 1 is not uniform, thereby causing light-distribution irregularity in luminance on the document. Thus, illuminating the document with light reflected from the reflector 2 allows the light distribution on the document to be uniform.

The light reflected from the document is reflected by the first mirror 3, the second mirror 5, and the third mirror 6 and is transmitted through the condenser lens 8 to thereby form an image on the light receiving surface of the CCD line sensor 9. The CCD line sensor 9 is mounted on a printed circuit board that provides the CCD sensor section 10, and is controlled by a control signal input from the image processor 11. Details of the image processor 11 will be described later with reference to FIG. 2.

The document press cover 14 is adapted to press the document, placed on the document glass 13, such that the scan surface of the document is in close contact with the document glass 13.

Analog signals output from the CCD line sensor 9, the configuration of which will be described below with reference to FIG. 3, contain high-frequency distortions due to a variation in the conversion efficiency of each photoelectric converter and low frequency distortions due to aberration caused by a reduction optical system employing the condenser lens 8. As a result, reference data is required to perform normalization/correction. In the present embodiment, image data obtained by scanning the white reference plate 12 is used as the reference data.

Figure 2:
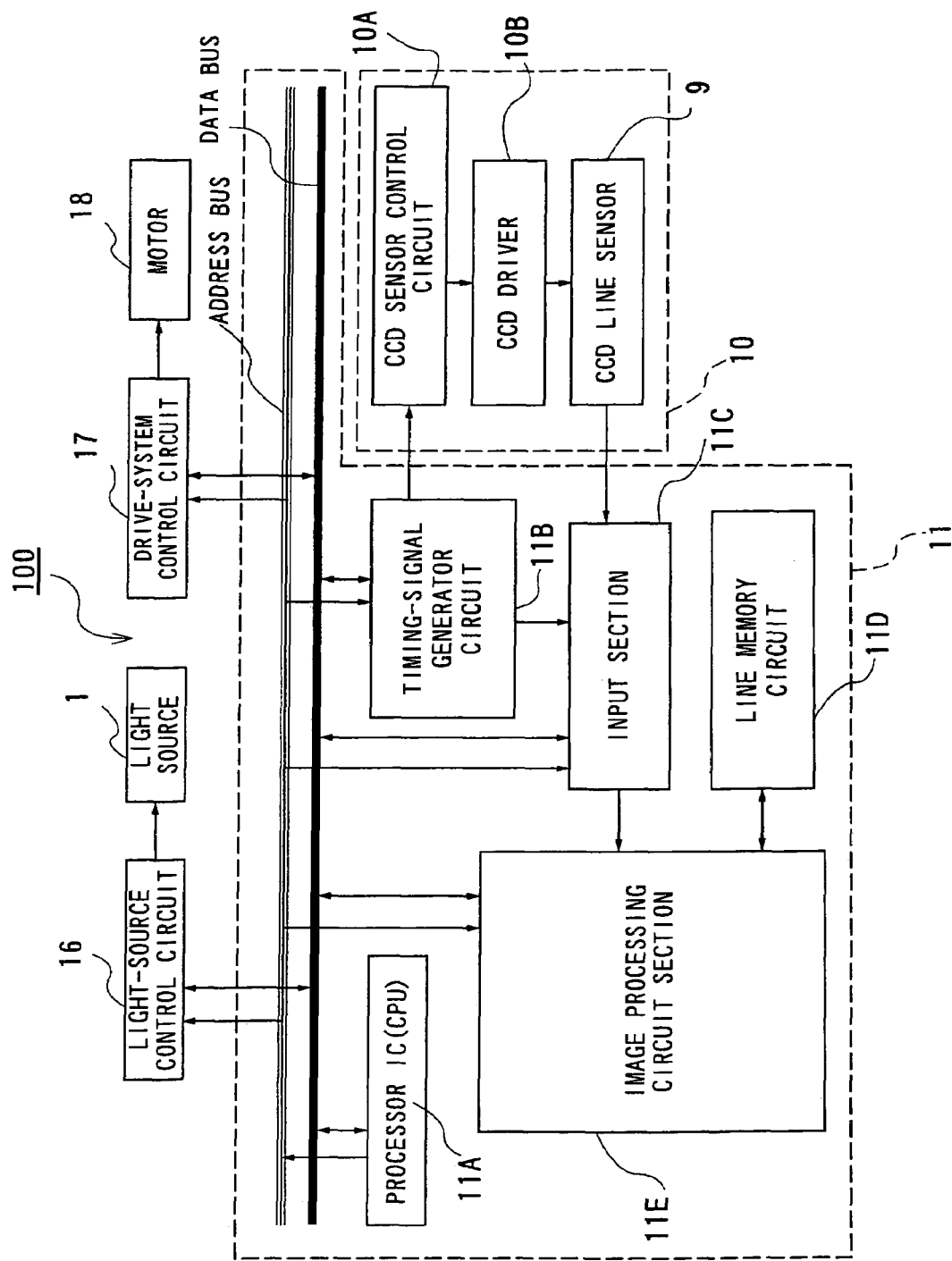
FIG. 2 is a block diagram showing an exemplary configuration of an image processor in the image scanning apparatus of the embodiment of the present invention.

Next, the configuration of the image processor 11 will be described with reference to FIG. 2.

The image processor 11 includes a processor IC (CPU) 11A for performing various types of processing, a timing-signal generator circuit 11B for generating various timing signals, an input section 11C, a line memory circuit 11D, and an image-processing circuit section 11E. The input section 11C inputs analog signals from the CCD line sensor 9 and converts the input signals into digital signals. The image-processing circuit section 11E performs image correction on the digital signals output from the input section 11C. Examples of the image correction include shading correction for correcting the high-frequency and low-frequency distortions and inter-line correction processing for correcting line position misalignment among line sensors. The line memory circuit 11D delays image data for each line, when the inter-line correction processing is performed.

The image-processing circuit section 11E has a resolution-enhancement processor 11EA. Using a signal of a monochrome CCD line sensor of the CCD line sensor 9, the resolution-enhancement processor 11EA (described below) enhances the resolution of signal of color CCD line sensors.

The processor IC (CPU) 11A controls a CCD sensor control circuit 10A, included in the CCD sensor section 10, and controls a light-source control circuit 16 for controlling the light emission of the light source 1. The processor IC 11A further controls a drive-system control circuit 17, which controls the motor 18 for moving the first carriage 4 and the second carriage 7.

The CCD sensor section 10 has the CCD line sensor 9, the CCD sensor control circuit 10A for driving the CCD line sensor 9, and a CCD driver 10B for adjusting the driving conditions of the CCD line sensor 9 in response to an output from the CCD sensor control circuit 10A.

Figure 3:
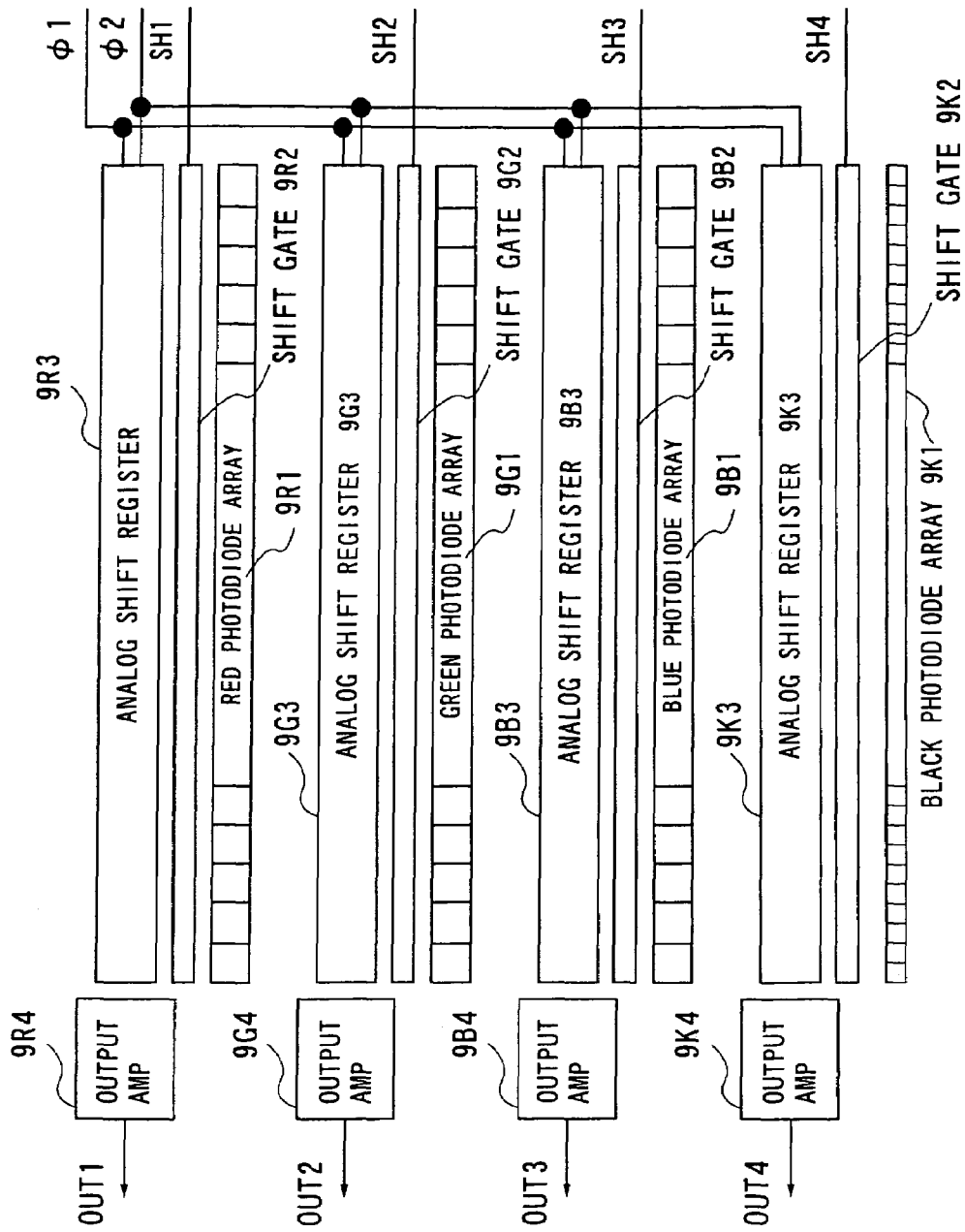
FIG. 3 is a schematic diagram of a CCD line sensor.

FIG. 3 is a diagram showing an exemplary configuration of the CCD line sensor 9.

A red photodiode array 9R1 has a red color filter (not shown) arranged on the light receiving surface and photoelectrically converts incident light into electrical charge corresponding to the amount of incident light. Each photodiode in the red photodiode array 9R1 stores the electrical charge. The stored electrical charge is transferred to an analog shift register 9R3 via a shift gate 9R2 by a control signal SH1 applied to the shift gate 9R2. In response to control signals $\phi 1$ and $\phi 2$, the electrical charge transferred to the analog shift register 9R3 is sequentially shifted to an output AMP 9R4 at the subsequent stage, and a signal OUT1 is output from the output AMP 9R4.

Similarly, a green photodiode array 9G1 has a green color filter (not shown) arranged on the light receiving surface and photoelectrically converts incident light into electrical charge corresponding to the amount of incident light. Each photodiode in the green photodiode array 9G1 stores the electrical charge. The stored electrical charge is transferred to an analog shift register 9G3 via a shift gate 9G2 by a control signal SH2 applied to the shift gate 9G2. In response to the control signals $\phi 1$ and $\phi 2$, the electrical charge transferred to the analog shift register 9G3 is sequentially shifted to an output AMP 9G4 at the subsequent stage, and a signal OUT2 is output from the output AMP 9G4.

Similarly, a blue photodiode array 9B1 has a blue color filter (not shown) arranged on the light receiving surface and photoelectrically converts incident light into electrical charge corresponding to the amount of incident light. Each photodiode in the blue photodiode array 9B1 stores the electrical charge. The stored electrical charge is transferred to an analog shift register 9B3 via a shift gate 9B2 by a control signal SH3 applied to the shift gate 9B2. In response to the control signals $\phi 1$ and $\phi 2$, the electrical charge transferred to the analog shift register 9B3 is sequentially shifted to an output AMP 9B4 at the subsequent stage, and a signal OUT3 is output from the output AMP 9B4.

A black photodiode array 9K1, which does not have a black color filter on the light receiving surface, photoelectrically converts incident light into electrical charge corresponding to the amount of incident light. Each photodiode in the black photodiode array 9K1 stores the electrical charge. The stored electrical charge is transferred to an analog shift register 9K3 via a shift gate 9K2 by a control signal SH4 applied to the shift gate 9K2. In response to the control signals $\phi 1$ and $\phi 2$, the electrical charge transferred to the analog shift register 9K3 is sequentially shifted to an output AMP 9K4 at the subsequent stage, and a signal OUT4 is output from the output AMP 9K4.

Figure 4:
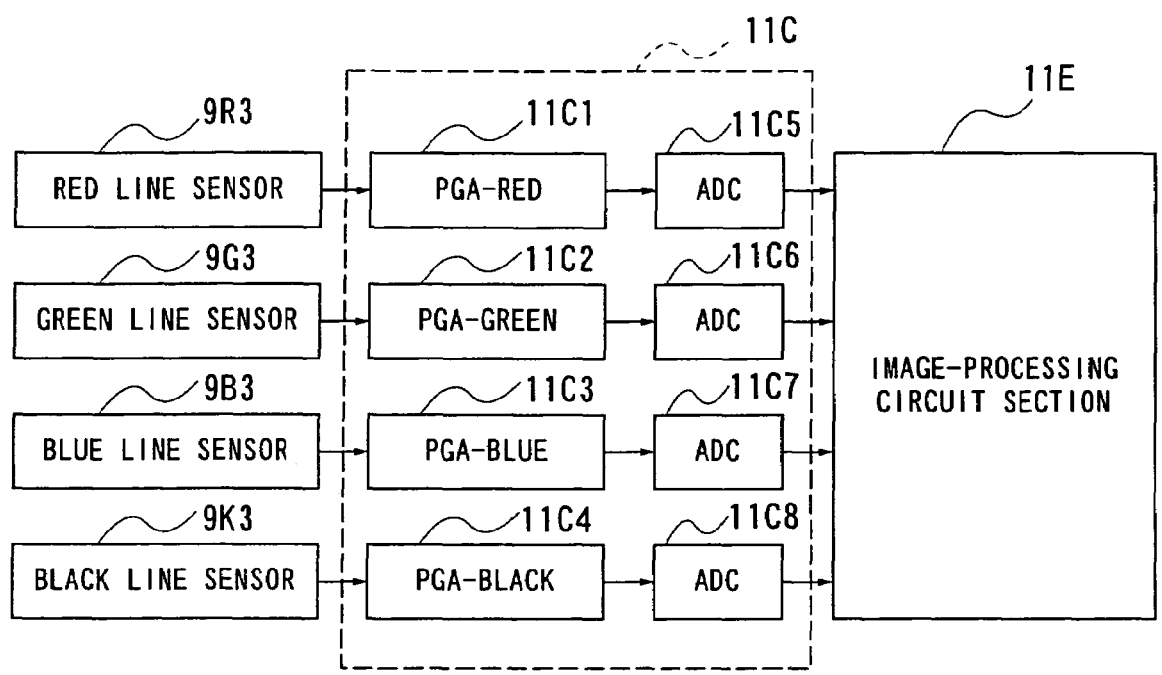
FIG. 4 is a block diagram showing an exemplary configuration of an input section in the image scanning apparatus of the embodiment of the present invention.

FIG. 4 is a diagram mainly showing the configuration of the input section 11C for inputting signals, sent from the CCD sensor 9, to the image processor 11. The input section 11C inputs the analog signals from the CCD sensor 9 and converts the analog signals into digital signals. Thereafter, the input section 11C performs processing, such as distortion correction (hereinafter referred to as "shading correction") and inter-line correction, on the digital signals.

Direct-current signal components contained in the analog signal OUT1 output from the red line sensor 9R3 shown in FIG. 3 are removed by a corresponding coupling capacitor (not shown) and then the resulting analog signal is sampled and held by a sample-and-hold circuit (not shown). The amplitude of the sampled and held analog signal is adjusted by a gain amplifier (PGA-RED) 11C1, which has a gain adjustable in response to an external signal, and the resulting signal is converted by an A/D converter (ADC) 11C5 at the subsequent stage into a digital image signal. The converted digital image signal is sent to an image-processing circuit section 11E at the subsequent stage.

Similarly, direct-current signal components contained in the analog signal OUT2 output from the green line sensor 9G3 are removed by a coupling capacitor (not shown) and then the resulting analog signal is sampled and held by a corresponding sample-and-hold circuit (not shown). The amplitude of the sampled and held analog signal is adjusted by a gain amplifier (PGA-GREEN) 11C2, which has a gain adjustable in response to an external signal, and the resulting signal is converted by an A/D converter (ADC) 11C6 at the subsequent stage into a digital image signal. The converted digital image signal is sent to the image-processing circuit section 11E at the subsequent stage.

Similarly, direct-current signal components contained in the analog signal OUT3 output from the blue line sensor 9B3 are removed by a corresponding coupling capacitor (not shown) and then the resulting analog signal is sampled and held by a sample-and-hold circuit (not shown). The amplitude of the sampled and held analog signal is adjusted by a gain amplifier (PGA-GREEN) 11C3, which has a gain adjustable in response to an external signal, and the resulting signal is converted by an A/D converter (ADC) 11C7 at the subsequent stage into a digital image signal. The digital image signal is sent to the image-processing circuit section 11E at the subsequent stage.

Similarly, direct-current signal components contained in the analog signal OUT4 output from the black line sensor 9K3 are removed by a coupling capacitor (not shown) and then the resulting analog signal is sampled and held by a corresponding sample-and-hold circuit (not shown). The amplitude of the sampled and held analog signal is adjusted by a gain amplifier (PGA-BLACK) 11C4, which has a gain adjustable in response to an external signal, and the resulting signal is converted by an A/D converter (ADC) 11C8 at the subsequent stage into a digital image signal. The converted digital image signal is sent to the image-processing circuit section 11E at the subsequent stage.

Figure 5:
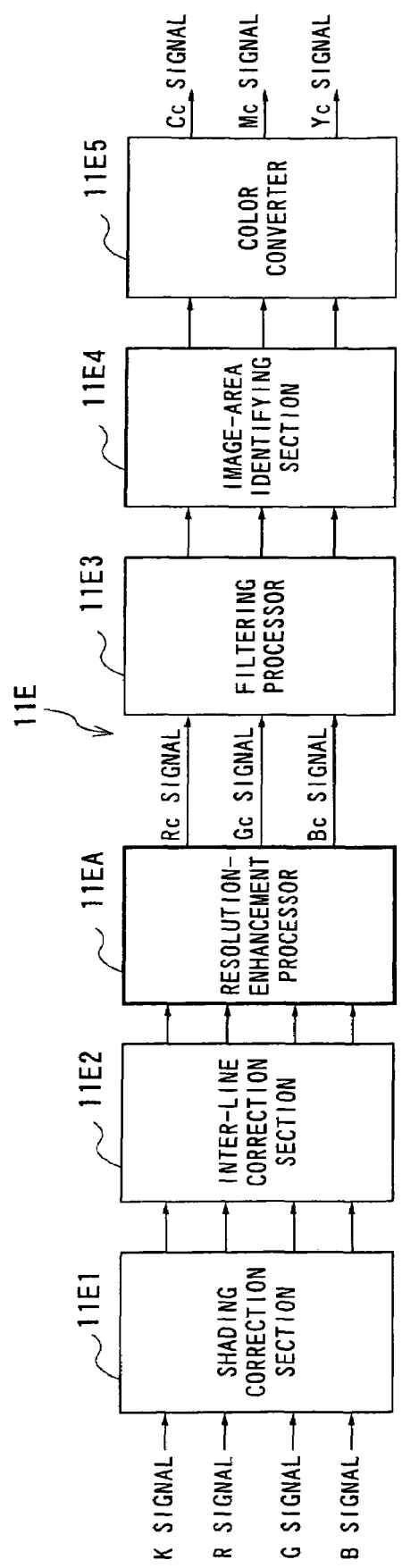
FIG. 5 is a block diagram showing an exemplary configuration of an image-processing circuit section in the image scanning apparatus of the embodiment of the present invention.

FIG. 5 is a diagram showing an exemplary configuration of the image-processing circuit section 11E.

The black, red, green, and blue output signals (hereinafter referred to as a "K signal", an "R signal", a "G signal", and a "B signal", respectively) are input to a shading correction section 11E1 and are subjected to shading correction. An inter-line correction section 11E2 at the subsequent stage performs inter-line correction for alignment, on the K signal, R signal, G signal, and B signal. The K signal, R signal, G signal, and B signal subjected to the inter-line correction are input to a resolution-enhancement processor 11EA.

The resolution-enhancement processor 11EA performs resolution-enhancement processing for enhancing the resolutions of the R signal, G signal, and B signal, by using the K signal. Details of this processing will be described later.

The signals which were subjected to the resolution-enhancement processing by the resolution-enhancement processor 11EA, (the signals are illustrated as an "Rc signal", a "Gc signal", and a "Bc signal" in the figure) are processed by a filtering processor 11E3 and an image-area identifying section 11E4 and the resulting signals are converted by a color converter 11E5 into a Cc signal (cyan), an Mc signal (magenta), and a Yc signal (yellow), respectively.

The image processing of the present invention is characterized in that, based on the black signal output from the 4-line CCD sensor, the image-processing circuit section 11E corrects the red, green, and blue signals output from the 4-line CCD sensor to provide high-resolution red, green, and blue signals.

The resolution-enhancement processing will now be described.

2) Resolution-Enhancement Processing

Prior to describing the resolution-enhancement processing, a description will be given of the resolution of the black sensor and the resolutions of the red, green, and blue sensor output signals that are to be input to the image processing circuit unit 11E.

The photodiode arrays, shift gates, analog shift registers, and output AMPs are arranged as shown in FIG. 3.

The size (hereinafter referred to as a "pixel size") of each photodiode in the red photodiode array 9R1, the green photodiode array 9G1, and the blue photodiode array 9B1 is larger than the pixel size of the black photodiode array 9B1. Correspondingly, the number of pixels of the red photodiode array 9R1, the green photodiode array 9G1, and the blue photodiode array 9B1 is smaller than the number of pixels of the black photodiode array 9K1.

Figure 6:
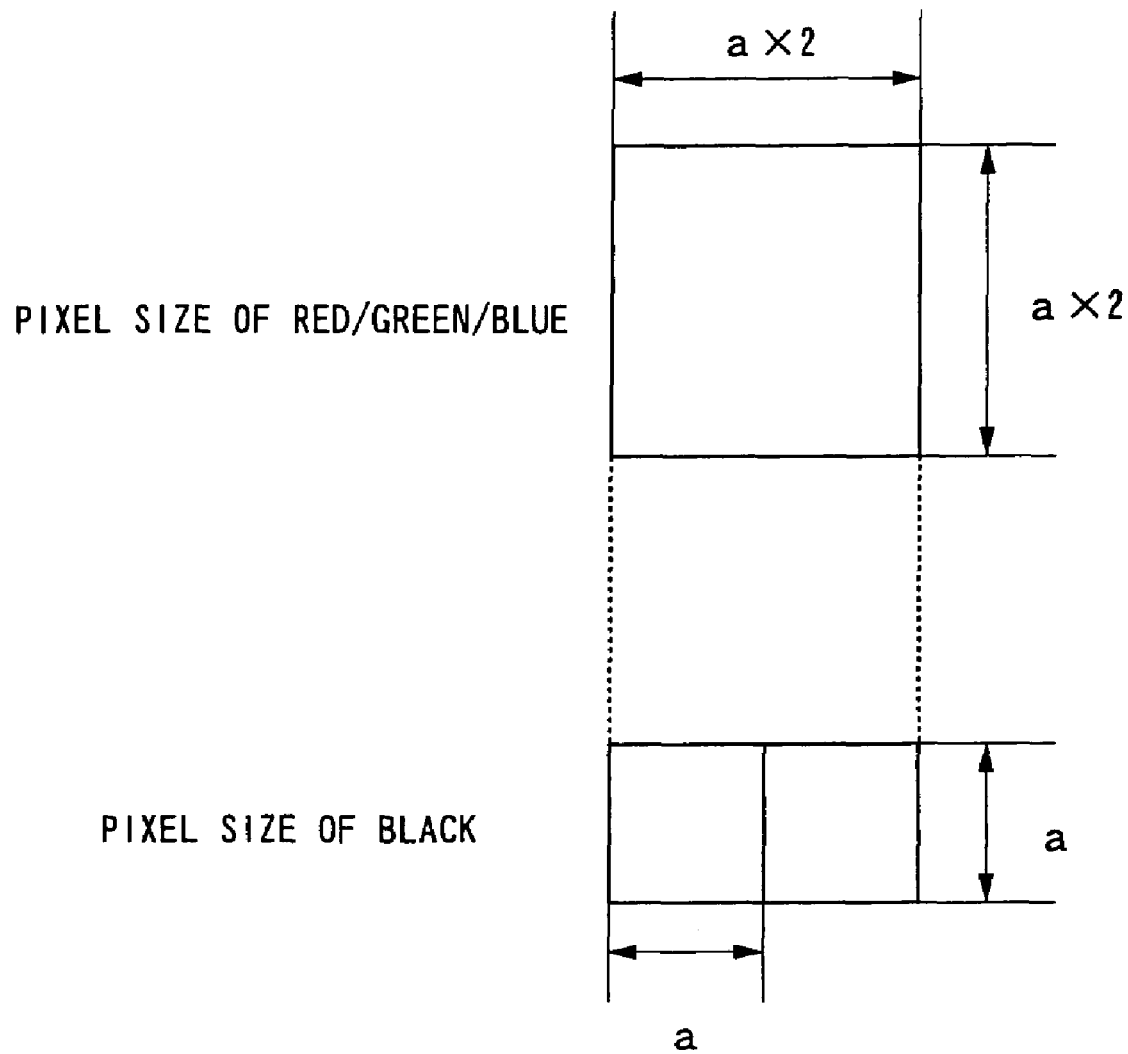
FIG. 6 is a diagram for comparison between the pixel size of a color CCD line sensor in the image scanning apparatus and the pixel size of a monochrome CCD line sensor according to the embodiment of the present invention.

Specifically, as shown in FIG. 6, it is assumed that the pixel size of the black photodiode array is a×a and the pixel size of the red photodiode array 9R1, the green photodiode array 9G1, and the blue photodiode array 9B1 is (a×2)×(a×2). In this case, since the longitudinal dimensions of the photodiode arrays are all the same, the number of pixels of the red photodiode array 9R1, the green photodiode array 9G1, and the blue photodiode array 9B1 is half the number of pixels of the black photodiode array 9K1. When the black photodiode array 9K1 scans the 297 mm length of A4 size paper at a resolution of 600 dpi, at least 7016 pixels are required because of 600 dpi/25.4 mm×297 mm=7015.7. When an error in the installation of the CCD line sensor 9 and a variation in the position on which a document is placed are considered, 7016+α pixels are required. Thus, it is herein assumed that the number of pixels of the black photodiode array 9K1 is 7500.

In this case, the number of pixels of the red photodiode array 9R1, the green photodiode array 9G1, and the blue photodiode array 9B1 is 3750, which is half the number (7500) of pixels of the black photodiode array 9K1.

When the CCD line sensor 9 is used to scan an image, the resolution of the red, green, and blue output signals is lower than (i.e., half) the resolution of the black output signal. In this case, the red, green, and blue signals are corrected using the black signal (this processing will hereinafter be referred to as "resolution-enhancement processing"), thereby performing resolution-conversion processing for providing red, green, and blue signals having a resolution equivalent to that of the black signal.

Next, a specific example of the resolution-enhancement processing performed by the resolution-enhancement processor 11EA will be described below.

In this example, it is assumed that the resolution of the red, green, blue output signals is 300 dpi, the resolution of the black output signal is 600 dpi, and an 8 bit signal (maximum 255=white) is used for processing. The horizon direction in FIGS. 7 to 10 corresponds to a main-scanning direction and the vertical direction corresponds to a sub-scanning direction. Since processing is performed on each of the R, G, and B signals in the resolution-enhancement processing, the R, G, and B signals will be collectively referred to as a "color signal" and the black color signal will be referred to as a "monochrome signal". This processing is characterized in that a color signal having a low resolution (300 dpi) and a monochrome signal having a high resolution (600 dpi) are used to output a color signal having a high resolution (600 dpi).

Figures 7, 8:
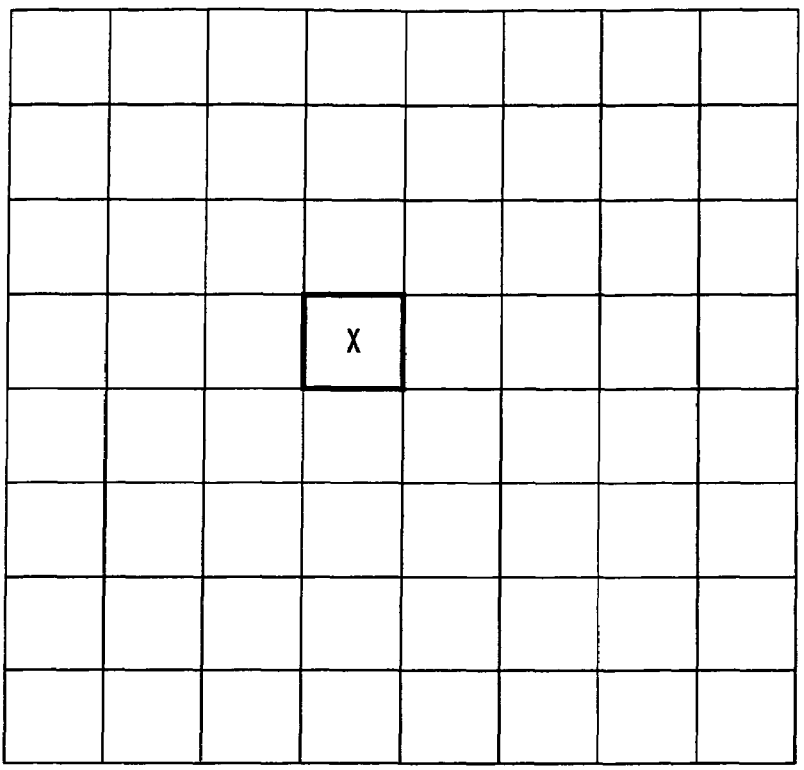
FIG. 7 is a first diagram illustrating the content of resolution-enhancement processing performed by the image scanning apparatus of the embodiment of the present invention.
FIG. 8 is a second diagram illustrating the content of the resolution-enhancement processing performed by the image scanning apparatus of the embodiment of the present invention.

FIG. 7 shows a position on which the resolution-enhancement processing is performed. The pixel resolution is assumed to be 600 dpi and a pixel to be subjected to resolution-enhancement processing is indicated by X.

FIG. 8 shows a monochrome signal for the same position as the position (shown in FIG. 7) to be subjected to the resolution-enhancement processing. A position corresponding to X shown in FIG. 7 is indicated by KX (one pixel of the monochrome signal). With KX being the center, three pixels at the left side in the main-scanning direction are indicated by K01, K02, and K03, three pixels at the right side are indicated by K05, K06, and K07, three pixels at the upper side in the sub-scanning direction are indicated by K11, K12 K13, and three pixels at the lower side are indicated by K15, K16, and K17.

Figures 9, 10:
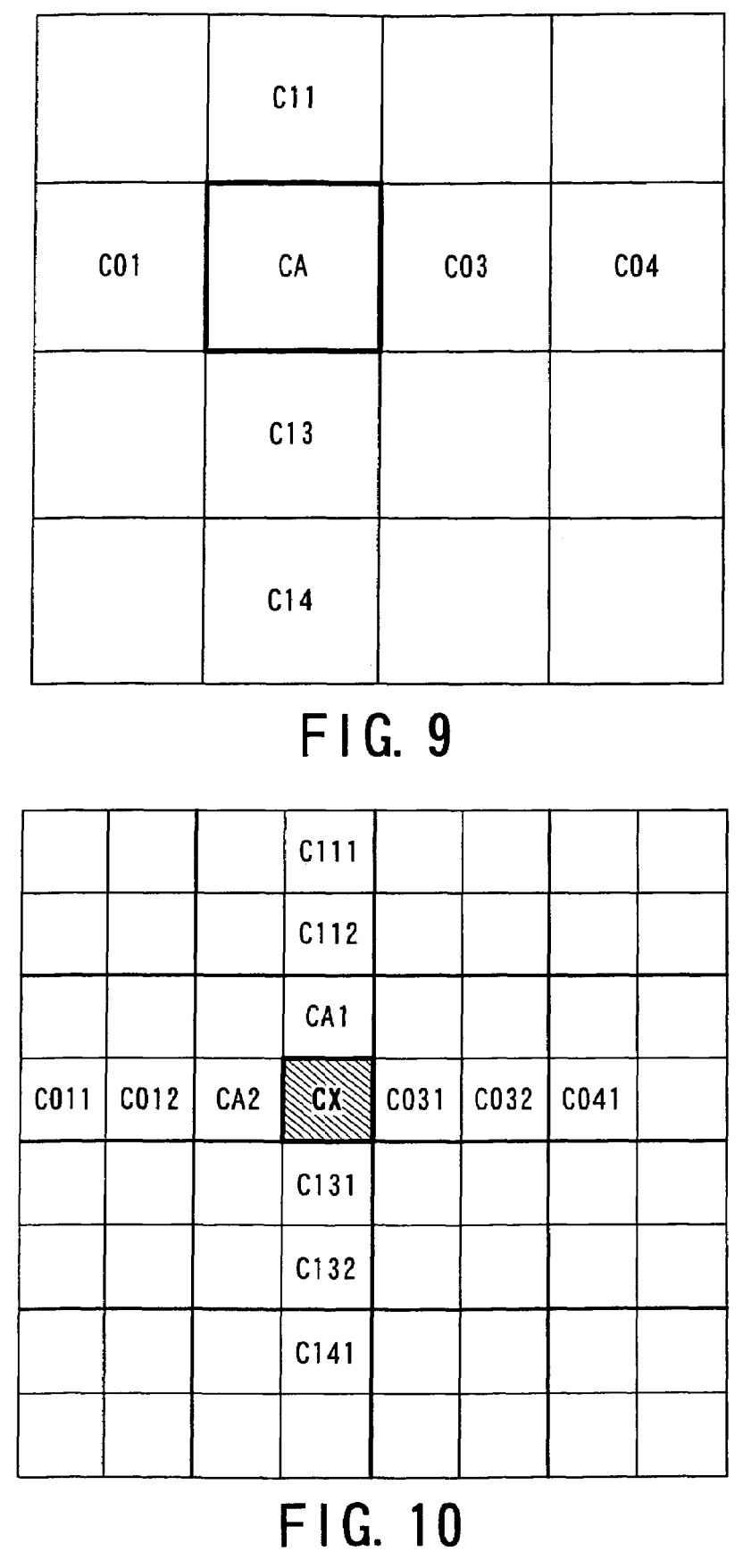

FIG. 9 shows a color signal for the same position as the position that is shown in FIG. 7 and that is to be subjected to the resolution-enhancement processing. Since FIG. 7 shows a correction position for a resolution of 600 dpi but the color signal is 300 dpi, both the dimension in the main-scanning direction and the dimension in the sub-scanning direction are twice the dimensions of the case of the monochrome signal. In FIG. 9, a pixel includes the same position as the pixel X in FIG. 7 is indicated by a pixel CA. With CA being the center, one pixel at the left side in the main-scanning direction is indicated by C01, two pixels at the right side are indicated by C03, C04, and one pixel at the upper side in the sub-scanning direction is indicated by C11, and two pixels at the lower side are indicated by C13 and C14.

FIG. 10 shows a case in which a signal of 300 dpi shown in FIG. 9 is converted into a signal of 600 dpi. A position corresponding to X shown in FIG. 7 is indicated by CX. With CX being the center, three pixels at the left side in the main-scanning direction are indicated by C011, C012, and CA2, three pixels at the right side are indicated by C031, C032, and C041, three pixels at the upper side in the sub-scanning direction are indicated by C111, C112, and CA1, and three pixels at the lower side are indicated by C131, C132, and C141. Since FIG. 10 shows a case in which a signal of 300 dpi shown in FIG. 9 is simply replaced with a signal of 600 dpi, the luminance values of the pixels are expressed by:

$$CA=CX=CA1=CA2$$

$$C01=C011=C012$$

$$C03=C031=C032$$

$$C04=C041$$

$$C11=C111=C112$$

$$C13=C131=C132$$

$$C14=C141$$

A specific example of the resolution-enhancement processing will be described below.

First, correction is performed using pixel information at the left side relative to a correction pixel position. An average KH1_4 (a first monochrome smoothed value) of four monochrome-signal pixels at the left side relative to the pixel KX shown in FIG. 8 and an average CH1_4 (a color smoothed value) of four color-signal pixels at the left side relative to the pixel CX shown in FIG. 10 are determined.

$$KH1\_4=(KX+K03+K02+K01)/4 \tag{1}$$

$$CH1\_4=(CX+CA2+C012+C011)/4 \tag{2}$$

Next, an average KH1_2 (a second monochrome smoothed value) of two monochrome-signal pixels at the left side relative to the pixel KX shown in FIG. 8 is determined.

$$KH1\_2=(KX+K03)/2 \tag{3}$$

Next, a difference between the average KH1_4 of the left four monochrome-signal pixels and the average KH1_2 of the left two monochrome-signal pixels is multiplied by a coefficient (a first coefficient) and the resulting value is added to the average CH1_4 of the left four color-signal pixels to determine a correction signal X1 (an intermediate color value). The coefficient for the addition may be arbitrary set. With a white luminance (255) being a reference (a luminance reference value), a value obtained by dividing a value, obtained by subtracting the average CH1_4 of the left four color-signal pixels from the luminance reference value, by a value, obtained by subtracting the average KH1_4 of the left four monochrome-signal pixels from the luminance reference value, may be used as the coefficient. That is, a value obtained by (255−CH1_4)/(255−KH1_4) may be used as the coefficient. In this case, the luminance reference value may be arbitrary set.

$$X1=CH1\_4+(255-CH1\_4)/(255-KH1\_4)\times(KH1\_2-KH1\_4) \tag{4}$$

Next, a difference between the monochrome correction-position signal KX and the average KH1_2 of the left two monochrome-signal pixels is multiplied by a coefficient (a second coefficient) and the resulting value is added to X1 determined by Equation (4) to thereby determine a signal X2. The coefficient for this addition may also be arbitrarily set. As in the coefficient (the first coefficient) for Equation (4), with the white luminance (255) being the reference, a value obtained by dividing a value, obtained by subtracting the value of X1 from the luminance reference value, by a value, obtained by subtracting the average KH1_2 of the left two monochrome-signal pixels from the luminance reference value, may be used as the coefficient (the second coefficient). In this case, the luminance reference value may be arbitrary set.

$$X2=X1+(255-X1)/(255-KH1\_2)\times(KX-KH1\_2) \tag{5}$$

X2 determined by Equation (5) serves as a left-side correction signal.

Next, correction is performed using pixel information at the right side relative to the correction pixel position. An average KH2_4 of four monochrome-signal pixels at the right side relative to the pixel KX shown in FIG. 8 and an average CH2_4 of four color-signal pixels at the right side relative to the pixel CX shown in FIG. 10 are determined.

$$KH2\_4=(KX+K05+K06+K07)/4 \tag{6}$$

$$CH2\_4=(CX+C031+C032+C041)/4 \tag{7}$$

Next, an average KH2_2 of two monochrome-signal pixels at the right side relative to the pixel KX shown in FIG. 8 is determined.

$$KH2\_2=(KX+K04)/2 \tag{8}$$

Next, a difference between the average KH2_4 of the right four monochrome-signal pixels and the average KH2_2 of the right two monochrome-signal pixels is multiplied by the coefficient (the first coefficient) and the resulting value is added to the average CH2_4 of the right four color-signal pixels to determine a correction signal X3 (an intermediate color value). The coefficient for the addition may be arbitrary set. With the white luminance (255) being the reference (a luminance reference value), a value obtained by dividing a value, obtained by subtracting the average CH2_4 of the four right color-signal pixels from the luminance reference value, by a value, obtained by subtracting the average KH2_4 of the four right monochrome-signal pixels from the luminance reference value, may be used as the coefficient. In this case, the luminance reference value may be arbitrary set.

$$X3=CH2\_4+(255-CH2\_4)/(255-KH2\_4)\times(KH2\_2-KH2\_4) \tag{9}$$

Next, a difference between the monochrome correction-position signal KX and the average KH2_2 of the right two monochrome-signal pixels is multiplied by the coefficient (the second coefficient) and the resulting value is added to X3 determined by Equation (9) to thereby determine a signal X4. The coefficient for this addition may be arbitrarily set. In addition, as in the coefficient (the first coefficient) for Equation (9), with the white luminance (255) being the reference, a value obtained by dividing a value, obtained by subtracting the value of X3 from the luminance reference value, by a value, obtained by subtracting the average KH2_2 of the right two monochrome-signal pixels from the luminance reference value, may be used as the coefficient (the second coefficient). In this case, the luminance reference value may be arbitrary set.

$$X4=X3+(255-X3)/(255-KH2\_2)\times(KX-KH2\_2) \tag{10}$$

X4 determined by Equation (10) serves as a right-side correction signal.

Lastly, X2 and X4 determined by Equations (5) and (10) are averaged to determine a correction signal XA in the main-scanning direction.

This correction signal XA serves as a color signal having a resolution enhanced in the main-scanning direction.

$$XA=(X2+X4)/2 \tag{11}$$

The use of this processing can provide a high-resolution color signal on which the resolution-enhanced processing has been performed in the main-scanning direction.

In the above description, processing for the pixels at the left side and processing for the pixels at the right side relative to the center KX are individually performed and then the resulting values are averaged to determine the correction XA. Alternatively, smoothed values with respect to areas at both the left and right sides relative to the center KX (i.e., first and second monochrome smoothed values and a color smoothed value) may be determined and then be substituted into Equations (4) and (5) to determine the correction signal XA in the main-scanning direction.

Applying the scheme used for Equations (1) to (11) to processing in the sub-scanning direction in the same manner allows correction in the sub-scanning direction. When this processing is used for correction in the sub-scanning direction, available methods include a method for determining a correction signal by using a monochrome signal and a color signal after being subjected to the resolution-enhancement processing in the main-scanning direction and a method for determining a correction signal by using a monochrome signal and a color signal before being subjected to the resolution-enhancement processing in the main-scanning direction. In the latter method, an average of the resulting value and XA is determined.

A description is now given of a specific example of a case in which a monochrome signal and a low-resolution color signal before being subjected to the main-scanning-direction resolution-enhancement processing are used.

First, as in the processing in the main-scanning direction, correction is performed using pixel information at the upper side relative to a correction pixel position. An average $KH3\_4$ of four monochrome-signal pixels at the upper side relative to the pixel KX shown in FIG. 8 and an average $CH3\_4$ of four color-signal pixels at the upper side relative to the pixel CX shown in FIG. 10 are determined.

$$KH3\_4=(KX+K13+K12+K11)/4 \quad (12)$$

$$CH3\_4=(CX+CA1+C112+C111)/4 \quad (13)$$

Next, an average $KH3\_2$ of two monochrome-signal pixels at the upper side relative to the pixel KX shown in FIG. 8 is determined.

$$KH3\_2=(KX+K13)/2 \quad (14)$$

Next, a difference between the average $KH3\_4$ of the upper four monochrome-signal pixels and the average $KH3\_2$ of the upper two monochrome-signal pixels is multiplied by the coefficient (the first coefficient) and the resulting value is added to the average $CH3\_4$ of the upper four color-signal pixels to determine a correction signal X5 (an intermediate color value). The coefficient for the addition may be arbitrary set. With the white luminance (255) being a reference (a luminance reference value), a value obtained by dividing a value, obtained by subtracting the average $CH3\_4$ of the upper four color-signal pixels from the luminance reference value, by a value, obtained by subtracting the average $KH3\_4$ of the upper four monochrome-signal pixels from the luminance reference value, may be used as the coefficient. In this case, the luminance reference value may be arbitrary set.

$$X5=CH3\_4+(255-CH3\_4)/(255-KH3\_4)\times(KH3\_2-KH3\_4) \quad (15)$$

Next, a difference between the monochrome correction-position signal KX and the average $KH3\_2$ of the upper two monochrome-signal pixels is multiplied by the coefficient (the second coefficient) and the resulting value is added to X5 determined by Equation (15) to thereby determine a signal X6. The coefficient for this addition may also be arbitrarily set. In addition, as in the coefficient (the first coefficient) for Equation (15), with the white luminance (255) being a reference, a value obtained by dividing a value, obtained by subtracting the value of X5 from the luminance reference value, by a value, obtained by subtracting the average $KH3\_2$ of the upper two monochrome-signal pixels from the luminance reference value, may be used as the coefficient (the second coefficient). In this case, the luminance reference value may be arbitrary set.

$$X6=X5+(255-X5)/(255-KH3\_2)\times(KX-KH3\_2) \quad (16)$$

X6 determined by Equation (16) serves as an upper-side correction signal.

Next, correction is performed using pixel information at the lower side relative to the correction pixel position. An average $KH4\_4$ of four monochrome-signal pixels at the lower side relative to the pixel KX shown in FIG. 8 and an average $CH4\_4$ of four color-signal pixels at the lower side relative to the pixel CX shown in FIG. 10 are determined.

$$KH4\_4=(KX+K15+K16+K17)/4 \quad (17)$$

$$CH4\_4=(CX+C131+C132+C141)/4 \quad (18)$$

Next, an average $KH4\_2$ of two monochrome-signal pixels at the lower side relative to the pixel KX shown in FIG. 8 is determined.

$$KH4\_2=(KX+K14)/2 \quad (19)$$

Next, a difference between the average $KH4\_4$ of the lower four monochrome-signal pixels and the average $KH4\_2$ of the lower two monochrome-signal pixels is multiplied by the coefficient (the first coefficient) and the resulting value is added to the average $CH4\_4$ of the lower four color-signal pixels to determine a correction signal X7 (an intermediate color value). The coefficient for the addition may be arbitrary set. With the white luminance (255) being a reference (a luminance reference value), a value obtained by dividing a value, obtained by subtracting the average $CH4\_4$ of the four lower color-signal pixels from the luminance reference value, by a value, obtained by subtracting the average $KH4\_4$ of the four lower monochrome-signal pixels from the luminance reference value, may be used as the coefficient. In this case, the luminance reference value may be arbitrary set.

$$X7=CH4\_4+(255-CH4\_4)/(255-KH4\_4)\times(KH4\_2-KH4\_4) \quad (20)$$

Next, a difference between the monochrome correction-position signal KX and the average $KH4\_2$ of the lower two monochrome-signal pixels is multiplied by the coefficient (the second coefficient) and the resulting value is added to X7 determined by Equation (20) to thereby determine a signal X8. The coefficient for this addition may be arbitrarily set. In addition, as in the coefficient (the first coefficient) for Equation (20), with the white luminance (255) being a reference, a value obtained by dividing a value, obtained by subtracting the value of X7 from the luminance reference value, by a value, obtained by subtracting the average $KH4\_2$ of the lower two monochrome-signal pixels from the luminance reference value, may be used as the coefficient (the second coefficient). In this case, the luminance reference value may be arbitrary set.

$$X8=X7+(255-X7)/(255-KH4\_2)\times(KX-KH4\_2) \quad (21)$$

X8 determined by Equation (21) serves as a lower-side correction signal.

Lastly, X6 and X8 determined by Equations (16) and (21) are averaged to determine a correction signal XB in the sub-scanning direction.

$$XB=(X6+X8)/2 \quad (22)$$

The use of this processing can provide high-resolution color signals on which the resolution-enhanced processing has been performed in the sub-scanning direction.

Lastly, the average of the correction signals in the main-scanning direction and the sub-scanning direction is determined to thereby determine the signal value of X shown in FIG. 7.

$$X=(XA+XB)/2 \quad (23)$$

When the method for determining the correction signal by using the color signal and the monochrome signal on which the resolution-enhancement processing in the main-scanning direction was performed are used, the signal X is given by the following:

$$X=XB \quad (24)$$

Performing the above-described processing on all pixels of 600 dpi can provide color signals equivalent to 600 dpi.

Since this processing is performed using the R, G, and B signals and the monochrome signal, performing the processing on each of the R, G, and B signals can provide red, green, and blue signals equivalent to 600 dpi.

Advantages of the above-described processing will be described below.

A first advantage is that the color resolution can be improved. The improvement in the color resolution will be described with reference to an image profile shown in FIG. 11.

Figure 11:
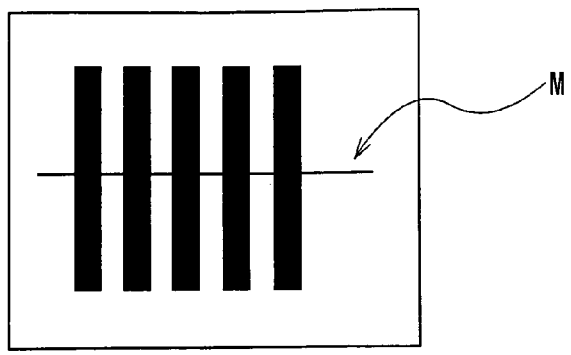
FIG. 11 is a first graph illustrating an effect of the resolution-enhancement processing performed by the image scanning apparatus of the embodiment of the present invention.
Figure 12:
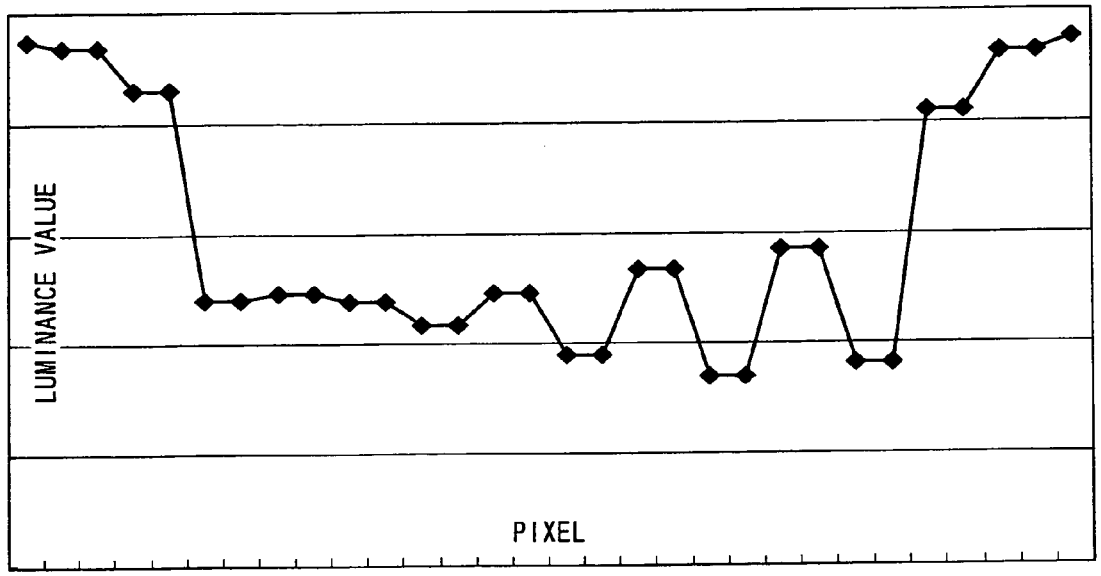
FIG. 12 is a second graph illustrating the effect of the resolution-enhancement processing performed by the image scanning apparatus of the embodiment of the present invention.
Figure 13:
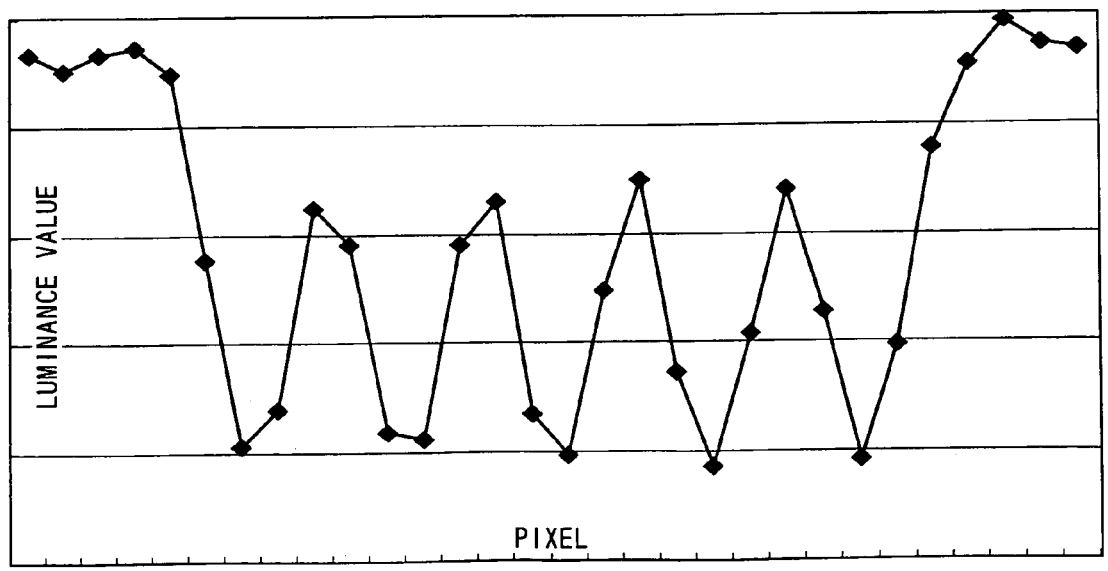
FIG. 13 is a third graph illustrating the effect of the resolution-enhancement processing performed by the image scanning apparatus of the embodiment of the present invention.

FIG. 12 shows a profile of one of the low-resolution color (red, green, and blue) signals and FIG. 13 shows a profile of the high-resolution monochrome signal. The scanned image is assumed to be an image that has alternately arranged black-and-white lines and has a profile of straight line M, as shown in FIG. 11. FIGS. 12 and 13 show profiles of image data obtained by scanning the same position, and the horizontal axis for the profile indicates a pixel and the vertical axis indicates a luminance value. It is assumed that, of the image processing in the flow diagram of FIG. 5, the processing up to the processing performed by the inter-line correction section 11E2 has been completed.

A comparison between FIG. 12 and FIG. 13 shows that the monochrome signal has a larger amplitude fluctuation. This is due to a difference between the color scanning resolution and the monochrome scanning resolution.

Figure 14:
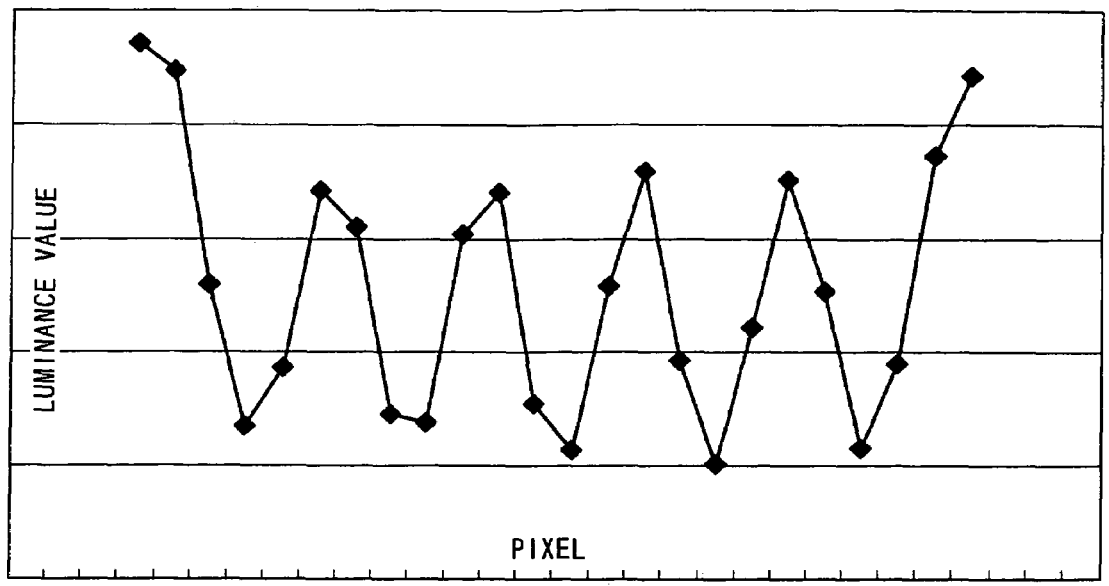
FIG. 14 is a fourth graph illustrating the effect of the resolution-enhancement processing performed by the image scanning apparatus of the embodiment of the present invention.
Figure 15:
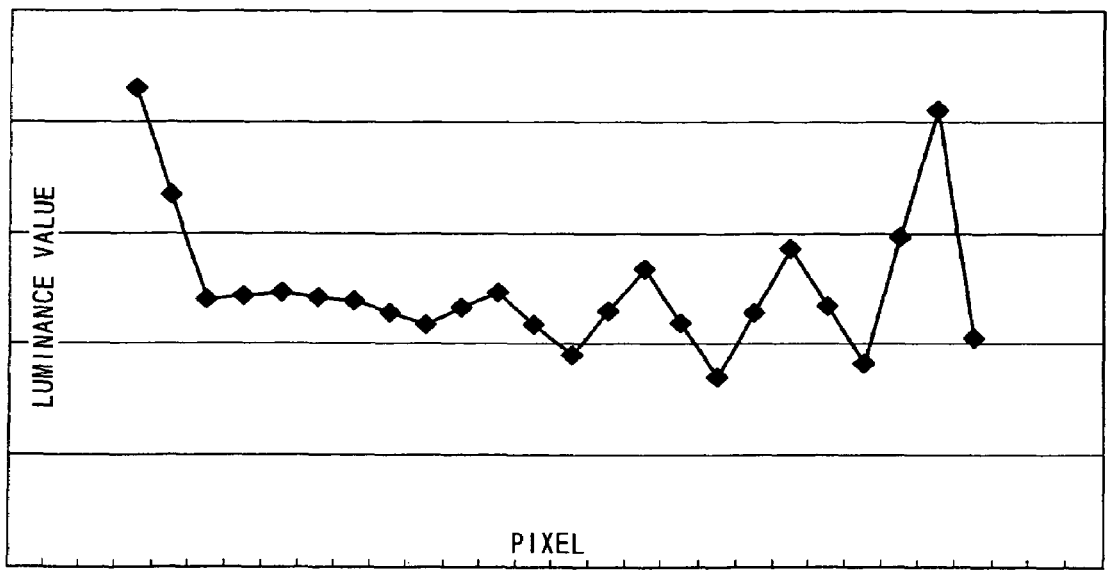
FIG. 15 is a fifth graph illustrating the effect of the resolution-enhancement processing performed by the image scanning apparatus of the embodiment of the present invention.

FIG. 14 shows a color-signal profile obtained by the resolution-enhancement processing of the present invention. FIG. 15 shows a color-signal profile obtained by performing simple interpolation processing on the color signal shown in FIG. 12. In FIGS. 14 and 15, the horizontal axis for the profile indicates a pixel and the vertical axis indicates a luminance value.

A comparison of those figures shows that the profile shown in FIG. 14 in which the resolution-enhancement processing of the present invention is used is closer to the monochrome-signal profile shown in FIG. 13 and has a clear difference in luminance between black and white edges in the image. As expressed by the profiles, the use of the processing of the present invention makes it possible to provide a high-resolution color signal, based on a low-resolution color signal and a high-resolution monochrome signal.

FIG. 15 shows a case in which the resolution of the low-resolution color signal shown in FIG. 12 is enhanced by simple linear interpolation. A comparison between FIG. 14 and FIG. 15 shows that high-luminance portions and low-luminance portions in output signals are more clearly reproduced in FIG. 14.

Performing such resolution-enhancement processing can match the resolution of low-resolution red, green, and blue output signals with the resolution of a black output signal and can provide high-resolution red, green, and blue correction signals.

A second advantage is that color misalignment in color signals can be reduced. The reduction in the color misalignment will be described with reference to an image profile shown in FIG. 16.

Figure 16:
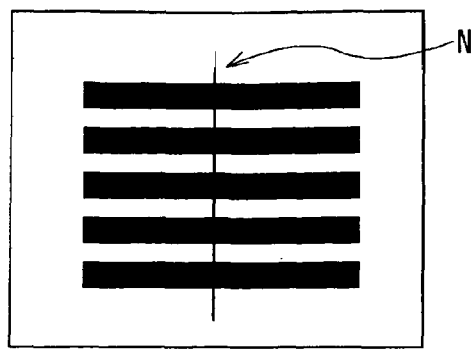
FIG. 16 is a sixth graph illustrating the effect of the resolution-enhancement processing performed by the image scanning apparatus of the embodiment of the present invention.

FIG. 16 shows an image that has alternately arranged black-and-white lines and has a profile of straight line N.

Figure 17:
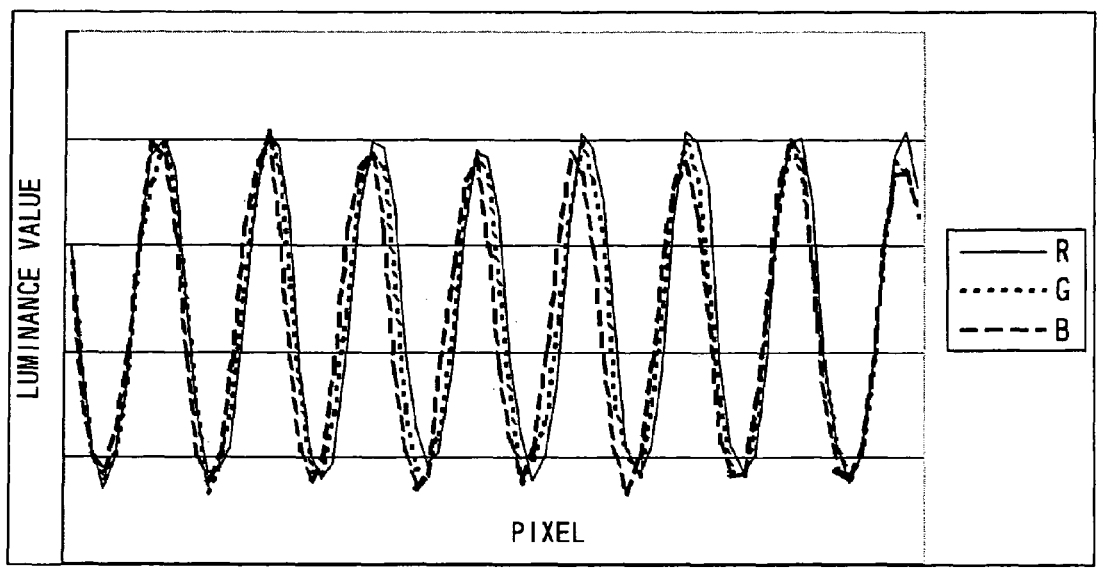
FIG. 17 is a seventh graph illustrating the effect of the resolution-enhancement processing performed by the image scanning apparatus of the embodiment of the present invention.

FIG. 17 shows the profile of an image scanned by a 3-line sensor that outputs red, green, and blue signals.

Figure 18:
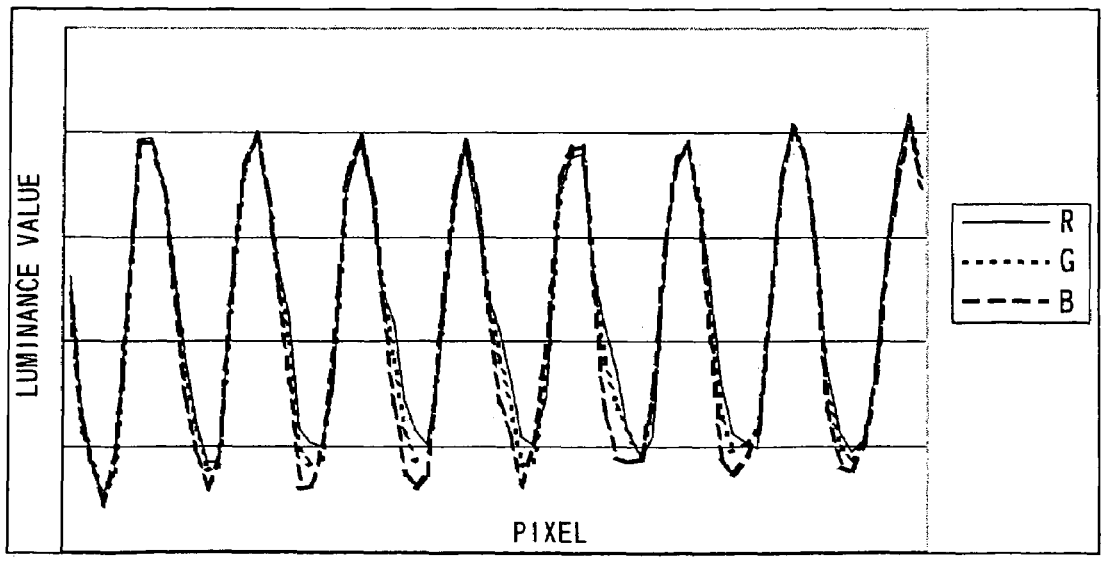
FIG. 18 is an eighth graph illustrating the effect of the resolution-enhancement processing performed by the image scanning apparatus of the embodiment of the present invention.

FIG. 18 shows the profile of an image that was scanned by the 4-line sensor shown in FIG. 3 and was then subjected to the above-described resolution-enhancement processing.

Since an image scanning apparatus as shown in FIG. 1 employs a motor-driven mechanism to scan an image, motor-speed irregularity, vibration, and so on often affect the image. The color line sensors have several-line gaps between the red photodiode array, the green photodiode array, and the blue photodiode array. Thus, when speed irregularity, vibration, or the like occurs, color misalignment is highly likely to occur. In the R-signal, G-signal, and the B-signal profiles shown in FIG. 17, color misalignment occurs due to the influences of speed irregularity, vibration, and so on.

However, when the processing of the present invention is used, the luminance values of surrounding pixels are averaged, as expressed by Equations (1), (2), (6), and (7). As a result of the averaging, information for each pixel is replaced with information for each area and the luminance value of the area and a monochrome signal are used to perform processing, thus making it possible to reduce the influence of color misalignment. As shown in FIG. 18, the profile has a small amount of color misalignment, compared to FIG. 17.

The image scanning apparatus 100 according to the present embodiment can enhance the resolution of the signals of the color CCD line sensors by using the signal of the monochrome CCD line sensor and also can reduce the color misalignment phenomenon due to motor drive.

Figure 19:
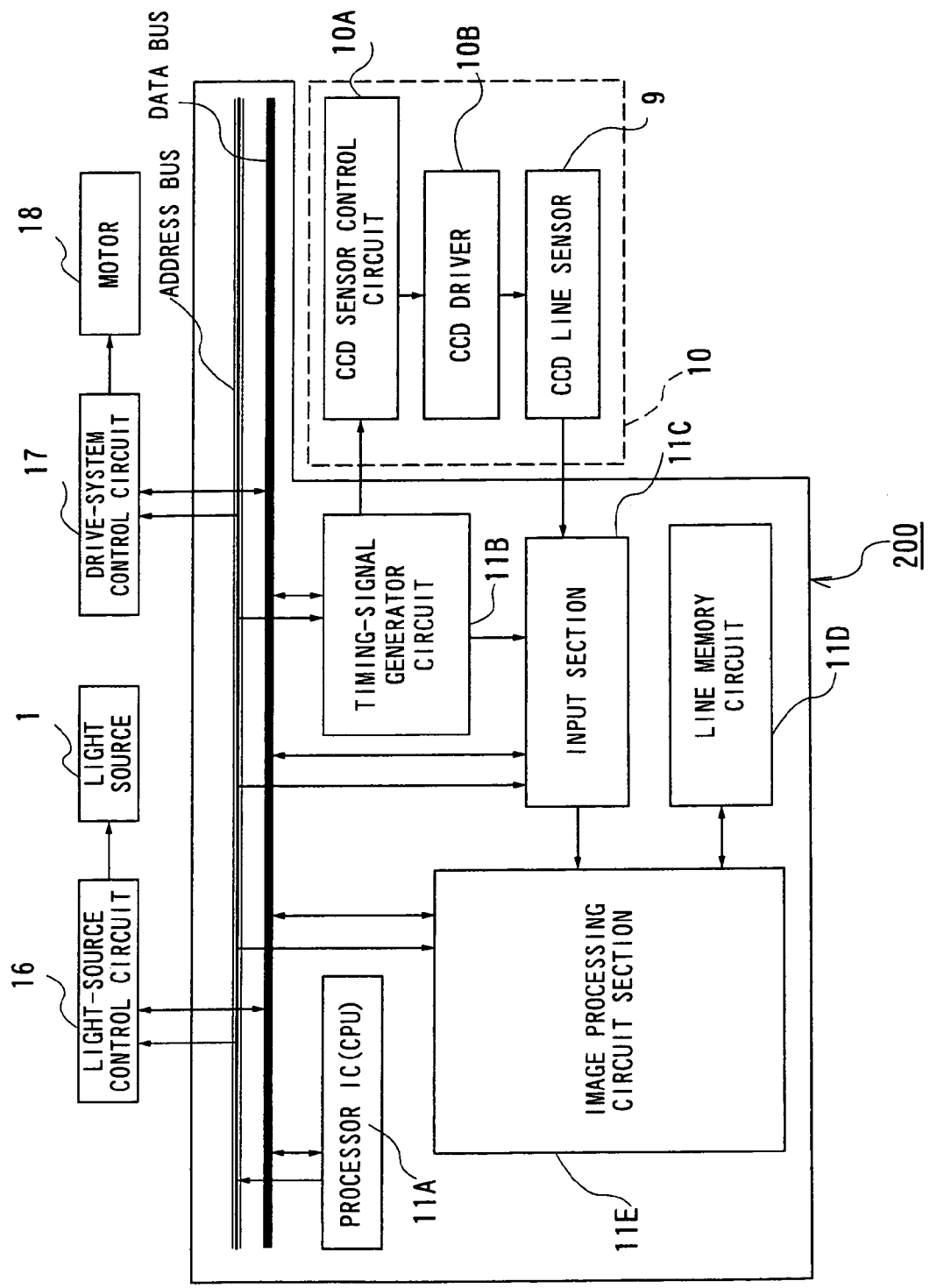
FIG. 19 is a block diagram showing an exemplary configuration of an image processing apparatus according to another embodiment of the present invention.

FIG. 19 is a diagram showing an exemplary configuration of an image processing apparatus 200 according to one embodiment of the present invention. The image processing apparatus 200 includes the image processor 11 of the image scanning apparatus 100 shown in FIG. 2. Since the configuration and operation of the image processing apparatus 200 are analogous to those of the image scanning apparatus 100, the descriptions thereof will not be given below.

Similarly to the image scanning apparatus 100, the image processing apparatus 200 according to the present embodiment can enhance the resolution of the signals of the color CCD line sensors by using the signal of the monochrome CCD line sensor and also can reduce the color misalignment phenomenon due to motor drive.

Figure 20:
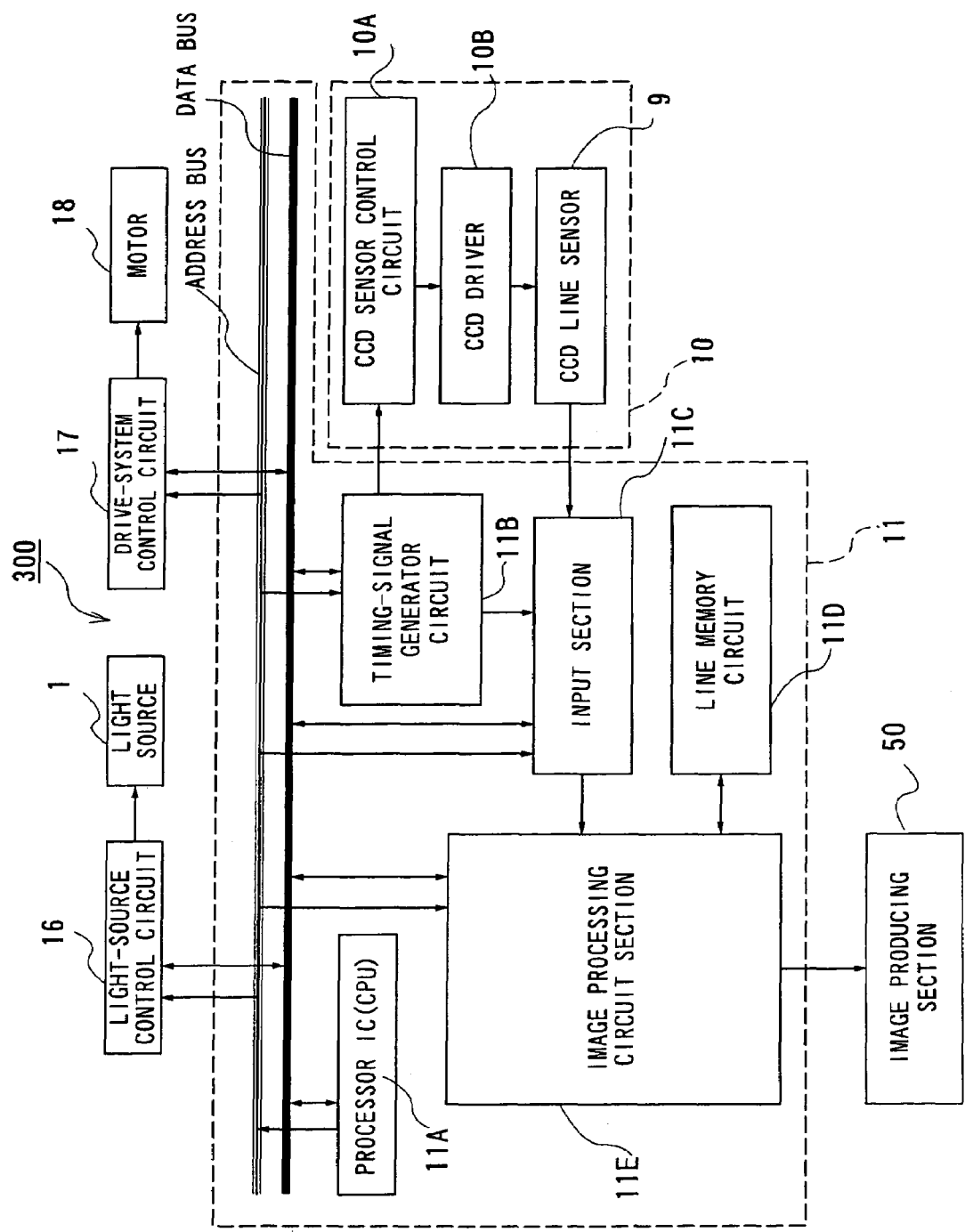
FIG. 20 is a block diagram showing an exemplary configuration of an image producing apparatus according to still another embodiment of the present invention.

FIG. 20 is a diagram showing an exemplary configuration of an image producing apparatus 300 according to one embodiment of the present invention. The image producing apparatus 300 has a configuration in which an image producing section 50 is added to the image scanning apparatus 100 shown in FIG. 2.

The image producing section 50 inputs a cyan signal (Cc signal), a magenta signal (Mc signal), and a yellow signal (Yc signal) output from the image processor 11, and prints a color image on print paper.

Since the configuration and operation of the elements other than the image producing section 50 are analogous to those of the image scanning apparatus 100, the descriptions thereof will not be given.

Similarly to the image scanning apparatus 100, the image producing apparatus 300 according to the present embodiment can enhance the resolution of the signals of the color CCD line sensors by using the signal of the monochrome CCD line sensor and also can reduce the color misalignment phenomenon due to motor drive.

The present invention is not only limited to the particular embodiments described above, and in practice, the elements described above can be modified and embodied without departing from the spirit and scope of the present invention. Some of the elements disclosed in the embodiments can be appropriately combined to achieve various modifications of the present invention. For example, one or more of the elements disclosed in the embodiments may be eliminated. In addition, the elements in the different embodiments may be appropriately combined.

What is claimed is:

1. An image scanning apparatus, comprising:
   three color line sensors for outputting red, green, and blue color signals, respectively;
   a monochrome line sensor for outputting a monochrome signal having a higher resolution than the color signals; and
   a resolution-enhancement processor for enhancing a resolution of a pixel signal of the color signals, based on a monochrome smoothed value obtained by smoothing a signal of an arbitrary pixel of the monochrome signal and signals of pixels around the arbitrary pixel and a color smoothed value obtained by smoothing a signal of a pixel of each color signal and signals of pixels around the pixel of the color signal, the pixel of the color signal corresponding to the position of the arbitrary pixel of the monochrome signal,
   wherein the resolution-enhancement processor determines
   a first monochrome smoothed value obtained by smoothing a signal of an arbitrary pixel of the monochrome signal and signals of a first area around the arbitrary pixel,
   a second monochrome smoothed value obtained by smoothing the signal of the arbitrary pixel of the monochrome signal and signals of a second area that is smaller than the first area, and
   a color smoothed value obtained by smoothing a signal of a pixel of the color signal and signals of the first area around the pixel of the color signal;
   the resolution-enhancement processor multiplies a value, obtained by subtracting the first monochrome smoothed value from the second monochrome smoothed value, by a first coefficient and then adds a resulting value to the determined color smoothed value to thereby determine an intermediate color value; and
   the resolution-enhancement processor multiplies a value, obtained by subtracting the second monochrome smoothed value from the signal of the arbitrary pixel of the monochrome signal, by a second coefficient and then adds a resulting value to the intermediate color value to thereby enhance the resolution of the pixel of the color signal.

2. The image scanning apparatus according to claim 1, wherein the first area and the second area are changeable.

3. The image scanning apparatus according to claim 1, wherein the first coefficient and the second coefficient are changeable.

4. The image scanning apparatus according to claim 1 wherein the first coefficient is a value obtained by dividing a value, obtained by subtracting the determined color smoothed value from a luminance reference value, by a value, obtained by subtracting the first monochrome smoothed value from the luminance reference value; and
   the second coefficient is a value obtained by dividing a value, obtained by subtracting the intermediate color value from the luminance reference value, by a value, obtained by subtracting the second monochrome smoothed value from the luminance reference value.

5. The image scanning apparatus according to claim 4, wherein the luminance reference value is changeable.

6. An image processing apparatus, comprising:
   an input section for inputting red, green, and blue color signals from three color line sensors and inputting, from a monochrome line sensor, a monochrome signal having a higher resolution than the color signals; and
   a resolution-enhancement processor for enhancing a resolution of a pixel signal of the color signals, based on a monochrome smoothed value obtained by smoothing a signal of an arbitrary pixel of the monochrome signal and signals of pixels around the arbitrary pixel and a color smoothed value obtained by smoothing a signal of a pixel of each color signal and signals of pixels around the pixel of the color signal, the pixel of the color signal corresponding to the position of the arbitrary pixel of the monochrome signal,
   wherein the resolution-enhancement processor determines
   a first monochrome smoothed value obtained by smoothing a signal of an arbitrary pixel of the monochrome signal and signals of a first area around the arbitrary pixel,
   a second monochrome smoothed value obtained by smoothing the signal of the arbitrary pixel of the monochrome signal and signals of a second area that is smaller than the first area, and
   a color smoothed value obtained by smoothing a signal of a pixel of the color signal and signals of the first area around the pixel of the color signal;
   the resolution-enhancement processor multiplies a value, obtained by subtracting the first monochrome smoothed value from the second monochrome smoothed value, by a first coefficient and then adds a resulting value to the determined color smoothed value to thereby determine an intermediate color value; and
   the resolution-enhancement processor multiplies a value, obtained by subtracting the second monochrome smoothed value from the signal of the arbitrary pixel of the monochrome signal, by a second coefficient and then adds a resulting value to the intermediate color value to thereby enhance the resolution of the pixel of the color signal.

7. The image processing apparatus according to claim 6, wherein the first area and the second area are changeable.

8. The image processing apparatus according to claim 6, wherein the first coefficient and the second coefficient are changeable.

9. The image processing apparatus according to claim 6, wherein the first coefficient is a value obtained by dividing a value, obtained by subtracting the determined color smoothed value from a luminance reference value, by a value, obtained by subtracting the first monochrome smoothed value from the luminance reference value; and the second coefficient is a value obtained by dividing a value, obtained by subtracting the intermediate color value from the luminance reference value, by a value, obtained by subtracting the second monochrome smoothed value from the luminance reference value.

10. The image processing apparatus according to claim 9, wherein the luminance reference value is changeable.

11. An image producing apparatus, comprising:

three color line sensors for outputting red, green, and blue color signals, respectively;

a monochrome line sensor for outputting a monochrome signal having a higher resolution than the color signals;

a resolution-enhancement processor for enhancing a resolution of a pixel signal of the color signals, based on a monochrome smoothed value obtained by smoothing a signal of an arbitrary pixel of the monochrome signal and signals of pixels around the arbitrary pixel and a color smoothed value obtained by smoothing a signal of a pixel of each color signal and signals of pixels around the pixel of the color signal, the pixel of the color signal corresponding to the position of the arbitrary pixel of the monochrome signal; and an image producing section for producing an image based on the color signals having the enhanced resolution, wherein the resolution-enhancement processor determines a first monochrome smoothed value obtained by smoothing a signal of an arbitrary pixel of the monochrome signal and signals of a first area around the arbitrary pixel, a second monochrome smoothed value obtained by smoothing the signal of the arbitrary pixel of the monochrome signal and signals of a second area that is smaller than the first area, and a color smoothed value obtained by smoothing a signal of a pixel of the color signal and signals of the first area around the pixel of the color signal;

the resolution-enhancement processor multiplies a value, obtained by subtracting the first monochrome smoothed value from the second monochrome smoothed value, by a first coefficient and then adds a resulting value to the determined color smoothed value to thereby determine an intermediate color value; and the resolution-enhancement processor multiplies a value, obtained by subtracting the second monochrome smoothed value from the signal of the arbitrary pixel of the monochrome signal, by a second coefficient and then adds a resulting value to the intermediate color value to thereby enhance the resolution of the pixel of the color signal.

12. The image producing apparatus according to claim 11, wherein the first area and the second area are changeable.

13. The image producing apparatus according to claim 11, wherein the first coefficient and the second coefficient are changeable.

14. The image producing apparatus according to claim 11, wherein the first coefficient is a value obtained by dividing a value, obtained by subtracting the determined color smoothed value from a luminance reference value, by a value, obtained by subtracting the first monochrome smoothed value from the luminance reference value; and the second coefficient is a value obtained by dividing a value, obtained by subtracting the intermediate color value from the luminance reference value, by a value, obtained by subtracting the second monochrome smoothed value from the luminance reference value.

15. The image producing apparatus according to claim 14, wherein the luminance reference value is changeable.

16. An image processing method, comprising:

an inputting step of inputting red, green, and blue color signals from three color line sensors and inputting, from a monochrome line sensor, a monochrome signal having a higher resolution than the color signals; and a resolution-enhancement processing step of enhancing a resolution of a pixel signal of the color signals, based on a monochrome smoothed value obtained by smoothing a signal of an arbitrary pixel of the monochrome signal and signals of pixels around the arbitrary pixel and a color smoothed value obtained by smoothing a signal of a pixel of each color signal and signals of pixels around the pixel of the color signal, the pixel of the color signal corresponding to the position of the arbitrary pixel of the monochrome signal, wherein, in the resolution-enhancement processing Step, a first monochrome smoothed value obtained by smoothing a signal of an arbitrary pixel of the monochrome signal and signals of a first area around the arbitrary pixel, a second monochrome smoothed value obtained by smoothing the signal of the arbitrary pixel of the monochrome signal and signals of a second area that is smaller than the first area, and a color smoothed value obtained by smoothing a signal of a pixel of color signal and signals of the first area around the pixel of the color signal are determined;

an intermediate color value is determined by multiplying a value, obtained by subtracting the first monochrome smoothed value from the second monochrome smoothed value, by a first coefficient and then adding a resulting value to the determined color smoothed value; and the resolution of the pixel of the color signal is enhanced by multiplying a value, obtained by subtracting the second monochrome smoothed value from the signal of the arbitrary pixel of the monochrome signal, by a second coefficient and then adding a resulting value to the intermediate color value.

17. The image processing method according to claim 16, wherein the first area and the second area are changeable.

18. The image producing method according to claim 16, wherein the first coefficient and the second coefficient are changeable.

19. The image producing method according to claim 16, wherein the first coefficient is a value obtained by dividing a value, obtained by subtracting the determined color smoothed value from a luminance reference value, by a value, obtained by subtracting the first monochrome smoothed value from the luminance reference value; and the second coefficient is a value obtained by dividing a value, obtained by subtracting the intermediate color value from the luminance reference value, by a value, obtained by subtracting the second monochrome smoothed value from the luminance reference value.

20. The image producing method according to claim 19, wherein the luminance reference value is changeable.

* * * * *